United States Patent
Pushkin et al.

(10) Patent No.: US 11,861,039 B1
(45) Date of Patent: Jan. 2, 2024

(54) HIERARCHICAL SYSTEM AND METHOD FOR IDENTIFYING SENSITIVE CONTENT IN DATA

(71) Applicant: Amazon Technologies, Inc., Seattle, WA (US)

(72) Inventors: Yahor Pushkin, Redmond, WA (US); Sravan Babu Bodapati, Redmond, WA (US); Sunil Mallya Kasaragod, San Francisco, CA (US); Sameer Karnik, Issaquah, WA (US); Abhinav Goyal, Snohomish, WA (US); Yaser Al-Onaizan, Cortlandt Manor, NY (US); Ravindra Manjunatha, Seattle, WA (US); Kalpit Dixit, Mountain View, CA (US); Alok Kumar Parmesh, Bothell, WA (US); Syed Kashif Hussain Shah, Santa Clara, CA (US)

(73) Assignee: Amazon Technologies, Inc., Seattle, WA (US)

(*) Notice: Subject to any disclaimer, the term of this patent is extended or adjusted under 35 U.S.C. 154(b) by 609 days.

(21) Appl. No.: 17/035,437

(22) Filed: Sep. 28, 2020

(51) Int. Cl.
*G06F 21/62* (2013.01)
*G06F 16/903* (2019.01)
(Continued)

(52) U.S. Cl.
CPC ........ *G06F 21/6245* (2013.01); *G06F 3/0619* (2013.01); *G06F 3/0623* (2013.01);
(Continued)

(58) Field of Classification Search
CPC .......... G06F 21/6245; G06F 16/90344; G06F 3/0619; G06F 3/0623; G06F 3/0683; G06N 20/00
See application file for complete search history.

(56) References Cited

U.S. PATENT DOCUMENTS

| 7,685,083 | B2 | 3/2010 | Fairweather |
| 9,003,542 | B1* | 4/2015 | MacKay ................. G06F 21/50 726/26 |

(Continued)

FOREIGN PATENT DOCUMENTS

CN  111191275 A  *  5/2020

*Primary Examiner* — Hee K Song
(74) *Attorney, Agent, or Firm* — S. Scott Foster; Kowert, Hood, Munyon, Rankin & Goetzel, P.C.

(57) ABSTRACT

Various embodiments of a hierarchical system or method of identifying sensitive content in data is described. In some embodiments, sensitive data classifiers local to a data storage system can analyze a plurality of data items and classify at least some data items as potentially containing sensitive data. The sensitive data classifiers can provide the classified data items to a separate sensitive data discovery component. The sensitive data discovery component can, in some embodiments, obtain the classified data items, perform a sensitive data location analysis on the classified data items to identify a location of sensitive data within some of the classified data items, and generate location information for the sensitive data within the data items containing sensitive data. The sensitive data discovery component can provide to a destination this information, in some embodiments, where the destination might redact, tokenize, highlight, or perform other actions on the located sensitive data.

20 Claims, 10 Drawing Sheets

(51) Int. Cl.
*G06F 3/06* (2006.01)
*G06N 20/00* (2019.01)

(52) U.S. Cl.
CPC ...... *G06F 3/0683* (2013.01); *G06F 16/90344* (2019.01); *G06N 20/00* (2019.01)

(56) References Cited

U.S. PATENT DOCUMENTS

| | | |
|---|---|---|
| 9,438,648 B2 | 9/2016 | Asenjo et al. |
| 9,734,169 B2 | 8/2017 | Redlich et al. |
| 10,018,993 B2 | 7/2018 | Lawson et al. |
| 10,182,073 B2 | 1/2019 | Redlich et al. |
| 10,275,396 B1 * | 4/2019 | Hart ...................... G06F 16/122 |
| 10,628,608 B2 | 4/2020 | Hebert et al. |
| 2005/0283620 A1 * | 12/2005 | Khulusi .............. H04L 63/0421 713/185 |
| 2010/0274750 A1 * | 10/2010 | Oltean .................. G06F 16/122 706/46 |
| 2014/0032417 A1 | 1/2014 | Mattsson |
| 2017/0236081 A1 | 8/2017 | Grady Smith et al. |
| 2018/0018404 A1 * | 1/2018 | Caldwell ............ G06Q 20/3224 |
| 2018/0276393 A1 * | 9/2018 | Allen .................... G06F 21/602 |
| 2018/0276401 A1 * | 9/2018 | Allen .................... G06F 21/6245 |
| 2018/0293400 A1 * | 10/2018 | Borup .................... G06F 21/554 |
| 2019/0171846 A1 * | 6/2019 | Conikee ................ G06F 21/577 |
| 2020/0302082 A1 * | 9/2020 | Carteri ................ G06F 21/6245 |
| 2020/0311304 A1 * | 10/2020 | Parthasarathy ..... G06F 11/3006 |
| 2020/0334381 A1 * | 10/2020 | Yarowsky ............. G06F 40/166 |
| 2021/0125615 A1 * | 4/2021 | Medalion ............... G06N 3/044 |
| 2021/0326537 A1 * | 10/2021 | Liu ........................ G06F 40/47 |

* cited by examiner

*Sensitive data classifier local to a data storage system analyzes a plurality of data items either stored in the storage system, or as they are being ingested into the storage system.*
*810*

*Sensitive data classifier classifies a subset of data items as containing sensitive data within a probability threshold.*
*820*

*Sensitive data classifier records which data items were classified as containing sensitive data.*
*830*

*The subset of data items classified as containing sensitive data, but not the other data items not classified as containing sensitive data, are provided to a separate Sensitive Data Discovery Component to identify a location of sensitive data text strings within the data items.*
*840*

FIG. 8

Sensitive data discovery service in a provider network obtains a request to provide a sensitive data classifier to a remote destination.
910

Provide a sensitive data classifier to a remote destination in accordance with the request, where the sensitive data classifier can analyze data items, and can identify which data items contain sensitive data text strings within a probability threshold.
920

⋮

Obtain the data items identified by the sensitive data classifier as containing sensitive data
930

Perform a sensitive data location analysis on the obtained data items to identify a location of sensitive data within the obtained data items that contain sensitive data
940

Generate location information for the sensitive data text strings within individual data items of the obtained subset of data items that contain sensitive data
950

Determine a specified destination for the location information for the sensitive data, possibly based on user input
960

Provide the location information for the sensitive data to the specified destination
970

FIG. 9

HIERARCHICAL SYSTEM AND METHOD FOR IDENTIFYING SENSITIVE CONTENT IN DATA

BACKGROUND

Implementing computing systems that manage large quantities of data, such as in data warehouses, often presents problems of scale. As demand for various types of computing services grows, and as the quantity of data grows, it may become difficult to service that demand without increasing the available computing resources accordingly. One type computing service where demand has been increasing is the analysis and protection of sensitive data that is potentially interleaved with the rest of content in those data warehouses. Owners and operators of large data sets desire to pinpoint sensitive data, and perhaps even redact the sensitive data, either before or during its storage in a data warehouse, or upon the data's access by a user from the data warehouse. For example, in provider networks large amount of data are stored by customers across various platforms the provider network offers, such as an object storage service of the provider network that uses a scalable storage infrastructure. Clients of the provider network desire to understand and protect sensitive data that is potentially interleaved with the rest of content in those data warehouses.

On technical side, it imposes a challenge to efficiently process and flag or cleanup (such as redact) sensitive data at that level of scale, which can be petabytes of content. Modern data storage platforms do not provide onsite facilities for processing of this sort for the data. Some current methods to process the data require transferring the entirety of the data for analysis and processing, which is a challenge on its own due to mere amount of data in question.

BRIEF DESCRIPTION OF THE DRAWINGS

FIG. 8 is a high-level flow chart illustrating methods and techniques for identifying sensitive content in data using a hierarchical system or method, from the perspective of the sensitive data classifiers, which identify data items containing sensitive data, and provide the identified data items to a separate sensitive data discovery component, according to some embodiments.

FIG. 9 is a high-level flow chart illustrating methods and techniques for identifying sensitive content in data using a hierarchical system or method, from the perspective of the sensitive data discovery service, which provides the sensitive data classifiers to a remote destination, according to some embodiments.

Figure 1:
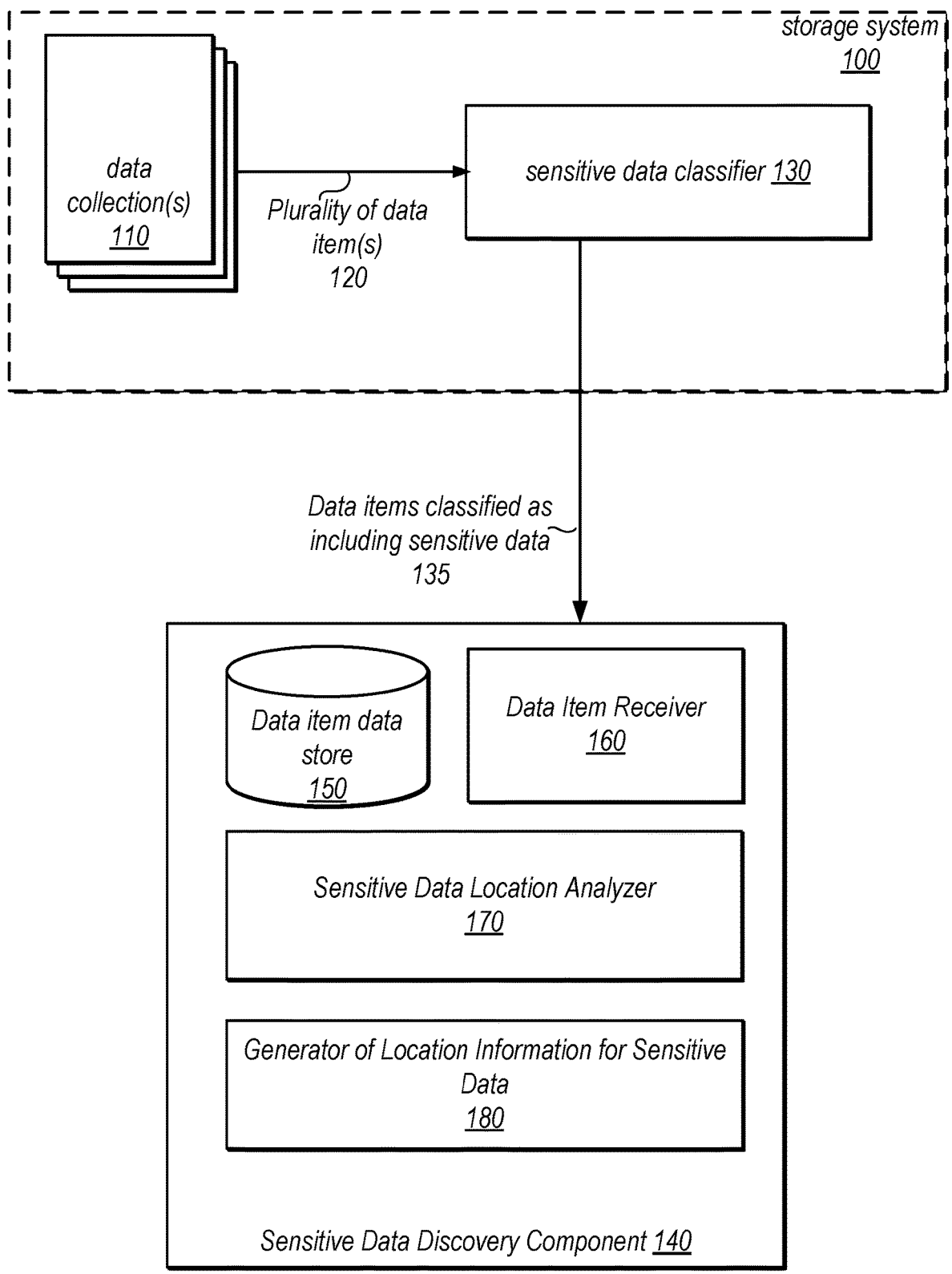
FIG. 1 is a logical block diagram illustrating a hierarchical system and method for identifying sensitive content in data comprising a storage system with a sensitive data classifier that classifies data items containing sensitive data, and a sensitive data discovery component that identifies a location of sensitive data within the received data items, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of a hierarchical system and method for identifying sensitive content in data are described herein. The hierarchical system and method can use a hierarchical detection/identification approach based on a pipeline of independently deployed models in order to identify and/or redact sensitive data at scale, according to some embodiments. The hierarchical system and method collocates a lightweight, stateless, resource-efficient pre-processing classification model along with data storage, in some embodiments. This model can be responsible for detecting the presence of sensitive data in the documents within a certain probability threshold, in some of these embodiments. This pre-processing classification model, that can be used by sensitive data classifiers, can in some embodiments use a binary classification in its most efficient and simple form. Documents can be flagged by this model, and then streamed for further analysis to a separately-deployed in-depth analysis model, capable of pinpointing exact location and nature of sensitive data—making the sensitive data available for highlighting and/or redaction, in some embodiments. This in-depth analysis model can be used by a sensitive data discovery service, for example. The hierarchical system and method for identifying sensitive content in data can thereby produce a conceptual data funnel that leads to minimizing the amount of data that needs to be transferred and analyzed in-depth, in some embodiments.

There are a lot of clients, or owners or users of data, with a lot of data to process, and these entities want to have an indication of what sensitive data items exist in their overall volume of data. Previously, the way for identifying sensitive data in large quantities of data has been expensive, and has involved the transmission of large quantities of data across the boundaries of multiple services, with all the expense and complications involved in that transmission and subsequent analysis. Therefore, for a large data collection, it was traditionally burdensome to transfer the large quantities of data to an analysis service, when only a small amount of data was potentially sensitive. In traditional systems, users would have to transmit over a network, and analyze huge amount of data, which is an inefficient way to monitor or analyze for sensitive data.

Some embodiments of the disclosed hierarchical system and method for identifying sensitive content in data solve the problem of identifying sensitive information in large quantities of data. The sensitive information can be Personal Identifiable Information ("PII"), in some embodiments, but can also be extended to other categories of sensitive data as well. The hierarchical system and method for identifying sensitive content in data solves these and other problems by a multi-tiered solution, in some embodiments, where the data is processed in at least two phases. During the first phase of these embodiments, a decision is made whether there is a chance that sensitive data is present in the portion of data that is being analyzed. Then, based on this decision, the data that is preliminarily classified as data that potentially contains the sensitive data, is processed using a more expensive, time-consuming, and accurate method in a second phase.

The disclosed hierarchical system and method for identifying sensitive content in data eliminates the need for processing 100% of data through the second expensive model in the second phase, in some embodiments. In many datasets, the density of sensitive data, such as PII, can be quite low compared to the actual total amount of data. There can be few occurrences of sensitive data, with a lot of data in between the sensitive data occurrences. The disclosed hierarchical system and method for identifying sensitive content in data, in some embodiments, can eliminate the need of processing of a large percentage of the non-sensitive data through a more expensive model, such as a model in the second phase. In addition, the disclosed hierarchical system and method for identifying sensitive content in data can, in some embodiments, eliminate the need to transmit large quantities of data across the boundary of services and entities, where that transmission of large quantities of data could even sometimes encompass unsecured public networks, by providing local analysis in a first phase that allows a high-level determination of the sensitive content in the data.

Phase I Analysis

The first phase of the hierarchical system and method for identifying sensitive content in data, which can include the sensitive data classifiers, can be collocated with where the data is stored, in some embodiments, such that the first phase provides a local analysis. In some embodiments, the initial phase one classifier can be executed on the storage host for the storage system itself, in some embodiments. In other embodiments, the phase one classifier can be hosted in close network proximity to the storage system so that the data stays within some kind of defined network security boundary, and so that data does not have to be sent over a long networking distance. In other embodiments, the phase one analysis might be provided by an event-driven compute service as the data is transferred to or stored in a data storage system.

The first phase analysis might be part of a storage service where data is stored, or it could be a provided model that is deployed locally by a user at its own data site, for example. A user might deploy a first phase model locally to identify the data that needs to be sent to an external component or service for a more detailed analysis. For example, the local analysis of the first phase can comprise a client-side library that the data storage service uses in order to make the decision that some portions of the data might comprise sensitive data, and therefore might require further processing to determine if sensitive data is present in a portion of the data. That client-side library can be part of the data storage system, in some embodiments. In other embodiments, the client-side library can be a hosted service that is associated with the data storage service. The hosting of the first phase implementation can be organized so that data transfer across the boundaries of a service or data center is not required, in some embodiments. The processing can be lightweight and can be either be embedded with a data storage system or service, or can be located in close proximity with the data storage service such that the data transfer cost is eliminated, depending on the embodiment.

Collocating the preliminary analysis with the data storage system or service, as provided by some embodiments of the first phase of the hierarchical system and method for identifying sensitive content in data, provides both increased efficiency of the compute services, as well as increased security for the data itself. The increased security can be provided by eliminating one or more boundaries across which the sensitive data must traverse, in some embodiments. The increased efficiency can be provided eliminating the need of processing a large percentage of the non-sensitive data through a more expensive model, as well as eliminating the need to transmit large quantities of data across networks, and/or across the boundary of services and entities.

In a provider network environment, the data might be stored in a data storage service of the provider network. The phase one analysis, such as the sensitive data classifiers, can be collocated with the provider network's data storage service, so that entirety of the data does not have to leave the context of the data storage service, in some embodiments. However, in other embodiments, the data might be stored on the systems of a client of the provider network, such that the client performs a phase one analysis before sending identified data items (or identified portions of data items) to the provider network for more comprehensive second phase analysis. In some of these embodiments, the provider network might provide the phase one analysis model to the client, such as in an executable package, for the client to perform the phase one analysis, before sending the identified or classified data to the provider network for the phase two analysis. In other embodiments, phase one might be provided as library or a container that can be, for example, dropped into the client's workflow.

In some embodiments, the phase one analysis model, which can be embodied in a sensitive data classifier, might be a trained machine learning model. The machine learning model might be trained to identify whether data items (or portions of data items) contain sensitive data somewhere within the data item, within a certain probability threshold for example. For the embodiments in which a service or provider network provides the phase one to clients, all the clients might be provided the same model, in some embodiments, while in other embodiments at least some clients might be provided different models. In some embodiments, a client might be provided phase one software comprising a machine learning model trained specifically for that client, such as using data from the client in the training of the model. The machine learning model provided to a client can be customized for particular client cases, in some embodiments.

The phase one analysis can employ a simpler, lightweight type model, in some embodiments. The phase one model can be fairly lightweight so as to not impact the performance of the storage service, since, in some embodiments, phase one is collocated with the storage service itself. The phase one analysis, such as provided by the sensitive data classifiers, might simply output an indication whether the data item contains sensitive data somewhere within the data item, within a certain probability threshold. Phase one, at a high level, can be viewed as a classification task, in some embodiments, where for every data item (or portion of a data item) being analyzed, a decision is made whether sensitive data is, or might be, contained within that data item (or portion of a data item). Phase one might simply add an extra layer of lightweight computing at the storage service, so that large quantities of data is not transmitted outside the storage service (such as being transmitted to a larger network or provider network).

Phase one can employ different types of models, depending on the embodiment. Some embodiments of phase one can use models that operate at the n-grams level. Using n-grams, the model can make a classification decision whether a data item (or portion of a data item) includes sensitive data. Some embodiments of phase one can use a binary classifier that will be implemented at the data item (or portion of a data item) level. In some embodiments, a linear regression classifier can be used for the purposes of collocating the preliminary analysis with data storage that contains the data to be analyzed. Any other resource-effective technique, which is simply more resource effective than the technique performed in the second phase, can be used in the first phase as an alternative, depending on the embodiment.

The phase one model can also flag data at a larger granularity, in some embodiments. Phase one might provide an indication for data at a file, document, or bucket type level, in these embodiments. However, a service can decide the size of the data portion to be analyzed in phase one, depending on the embodiment, and the disclosed hierarchical system and method for identifying sensitive content in data supports multiple different sizes of data items (or portions of data items) that can be analyzed. For example, the data to be analyzed can be a paragraph of text, a multi-page PDF document, a certain number of file bytes, either raw or encrypted, or any content or quantity of content that is needed. In some embodiments, the phase one model can operate at the chunk level. For example, the phase one model might operate on file chunks. All different sizes of data portions can be supported by the different embodiments of phase one.

In some embodiments, phase one can identify, in an intelligent manner, using machine learning for example, the parts of files likely to contain certain types of information. Phase one can extract those parts of the files to be sent to the second phase. For example, phase one might determine that images or graphics in a file would not contain PII, and extract those portions of a file before sending to the second phase. As another example, phase one might determine that only the ASCII text part of a file might contain PII, and only send the ASCII text part of a file to the second phase. As another example, phase one might determine that only certain rows or columns of a table might contain PII, and only send those particular rows or columns to the second phase. Therefore, instead of processing an entire large file, for example, phase one can be smart about what portions of the file should be analyzed and/or sent to the second phase.

Phase one might employ the second phase for multiple different rounds of communication and analysis on the same or similar data item, in some embodiments. Phase one might send a portion of data to phase two, and only if sensitive data is found, then it might send other portions of the data, in some embodiments. For example, phase one might come to the conclusion that if a file contains PII, then the metadata of the file would also contain PII. Phase one might only send the metadata of a file to phase two for analysis in a first round. If phase two returns a result that the metadata contains sensitive data, then phase one might thereby send the remainder of the file to phase two for analysis in a second round. If phase two returns a result that the metadata does not contain PII, then phase one would indicate the file as not containing sensitive data, for example.

Phase II Analysis

The second phase analysis of the disclosed hierarchical system and method for identifying sensitive content in data, can be a more comprehensive analysis, in some embodiments. The second phase analysis can be a strong tagger or sequence tagger, in some embodiments. The second phase analysis might examine every portion of text very carefully, and attempt to tag where the sensitive data or PII is located in the particular portion of data, in some of these embodiments. The second phase analysis is usually not performed by simple techniques. Rather, the second phase analysis requires a sophisticated classifier with a fairly high percentage accuracy, in some preferred embodiments. The second phase analysis can specifically identify the exact character strings in the data that are sensitive data, in some of these embodiments. The second phase analysis can be used to identify tokens of input text that belong to one of sensitive data types, in some embodiments. These sensitive data types might be a name, social security number, credit card number, or other kinds of personally identifiable information, for example.

The second phase analysis might use a transformer encoder, in some embodiments. A transformer encoder can be a stronger, more thorough computation that can identify sensitive data with much greater accuracy that the phase one analysis. The second phase analysis can be used to perform sequence tagging on the input data items. In some of these embodiments, a transformer-based sequence tagging model is used to identify tokens of the input text that belong to one of sensitive data types. The model can be computationally heavy, and can require a dedicated fleet of compute servers (or accelerated instances) to be able to process large amount of data, in some embodiments. Because the second phase analysis can require a fleet of compute instances or servers, in some embodiments, it is hard to impossible to collocate the model with data storage. Therefore, the second phase analysis is separate from the data storage and a first phase analysis in most preferred embodiments.

The second phase analysis can be a hosted dedicated service for doing a deeper type of analysis. The owner of the data might request to have the second phase analysis performed, in some embodiments. The owner might request a sensitive data discovery service of a provider network to perform the second phase analysis. The owner can send the data to the provider network securely. The owner needn't send every piece of data to the provider network, but only those data items (or portions of data items) classified as potentially containing sensitive data by the first phase analysis. This saves the cost of transferring large portions of data to the provider network. For example, within 100 GB of data, there might exist only 1 GB of sensitive data classified as potentially containing sensitive data by the first phase analysis, and so the disclosed system and method can save the owner of the data the transfer of the remaining 99 GB of data to the provider network.

In other embodiments, the owner or user of the data might perform the second phase analysis in-house, without making an external request to an external service. The owner of the data might have their own second phase analysis that can perform a more comprehensive analysis on the data items from the first phase, to identify locations of sensitive data. In these embodiments, the owner also needn't send every piece of data to the in-house service, but only those data items (or portions of data items) classified as potentially containing sensitive data by the first phase analysis. This saves the cost of transferring large portions of data to the in-house service. For example, within 100 GB of data, there might exist only 1 GB of sensitive data classified as potentially containing sensitive data by the first phase analysis, and so the disclosed system and method can save the owner of the data the transfer of the remaining 99 GB of data to the in-house service.

The output of the second phase of analysis (such as output by a sensitive data discovery component or service) of the disclosed hierarchical system and method for identifying sensitive content in data can take many forms, depending on the embodiment. The output can be a data location identifier of the sensitive data, in some embodiments. For example the output might be a data item identifier (or portion of a data item identifier) and an offset with that data item (or portion of a data item) that contains sensitive data. With documents, for example, the second phase analysis will receive the documents and can provide the location of all the sensitive data items within those documents, in some embodiments. The location can comprise offsets, such as character or Unicode character offsets, in some embodiments. In addition to the location of sensitive data, the second phase analysis can also output the type of sensitive data that was located, in some embodiments. For example, the second phase might of PII that was encountered, such as name, social security number, credit card number, or other kinds of personally identifiable information, for example.

The output of the second phase analysis (such as output by a sensitive data discovery component or service) can be the original data with the sensitive data marked in some way, in some embodiments. This output can be in addition to, or instead of, the second phase analysis's output of a data location identifier of the sensitive data, depending on the embodiment. For example, the second phase analysis can receive data as an input, and output data as an output, where the output contains the sensitive data replaced with something else. This something else can be whatever the user or client requests, in some embodiments. For example, the sensitive data might be redacted, or tokenized, or highlighted, depending on the embodiment. The sensitive data might be replaced with a mask, such as a series of "*" characters, in some embodiments. The sensitive data might be replaced with a type of entity, in some embodiments. For example, a person's name in the data might be simply replaced with the characters "(PERSON)", either in parenthesis or without the parenthesis. As another example, a credit card number might be replaced with the characters "CREDIT CARD NUMBER" in the data.

The phase one analysis and the phase two analysis can be used and/or operated as separate independent analysis, in some embodiments. The phase two analysis just needs to receive the data, and doesn't depend on any information about the analysis of the first stage, in some of these embodiments. In other words, phase two just needs the data to analyze. Both phase one and phase simply input the data, in these embodiments. In other words, phase two does not receive any output of any features from phase one. This functionality can further enhance the maintainability of the system. For example, if phase one is deployed to an external network, such as a client network, along with libraries for executing phase one, the lifecycle of phase one can be independent of the lifecycle of phase two, in these embodiments. Phase one and phase two might be hosted at different places and controlled by different entities. Maintenance for phase one and phase two can therefore occur independently so that any maintenance issues, or feature upgrades, can be accomplished for one phase without waiting for or having to coordinate with the other phase. Iterations on the different phases can occur completely independently, in these embodiments.

Use Cases

There can be a number of use cases for the presented hierarchical system and method for identifying sensitive content in data. One use case can be with a database. Either as data is being stored in the database, or for data in the database, a local phase one analysis can classify data items of the database that contain sensitive data, or might contain sensitive data, or that contain sensitive data within a probability threshold. These classified data items can be sent to a separate data discovery component for a more detailed analysis.

Another use case can be with files in a file system that operates in a similar manner. Another use case is with streaming data, where phase one can be implemented within the stream so that the classification is done as messages go through the stream, and the portions of the data from the stream which are classified as containing sensitive data (or might contain sensitive data, or that contain sensitive data within a probability threshold) are sent to phase two, in some embodiments. The downstream consumers of the stream might get a redacted version of the data, in some of these embodiments. Other use cases are can be a log data service that stores log data, with IoT devices and the data they store, or with an IoT device service that operates on data from multiple IoT devices, depending on the embodiment.

More generally, with any data store, the first phase analysis might be part of a storage service where data is stored. For example, the first phase analysis might be provided by a data storage service of a provider network, or might be a separate service that operates local to, or in close network proximity to, the data storage service of a provider network. The first phase analysis could also be a provided model that is deployed locally by a user at its own data site, for example. A user might deploy a first phase model locally to identify the data that needs to be sent to an external component or service, such as in a provider network, for a more detailed analysis. The first phase analysis might operate as data in ingested into the data store, or it might operate on data already resident at the data store, depending on the embodiment.

In some embodiments, the sensitive data can be redacted from the analyzed data items by the sensitive data discovery component or service, or based on the location data provided by sensitive data discovery component or service, depending on the embodiment. In different use cases, the sensitive data can be analyzed and/or redacted on the fly, or upon access, or on data write, depending on the application and use case. For example, the data might already be stored, and at access time the phase one and phase two analyses might be employed and the requestor presented with data where the sensitive data is redacted. Else, the hierarchical system and method for identifying sensitive content in data might be employed as data is written to the data store, such that the data store itself contains data with sensitive data redacted, or the data store contains the unredacted data, along with metadata that contains the results of the phase two analysis (such as the location of the sensitive data in the stored data). In other embodiments, the first phase analysis might be employed on the data in the data store (either as the data is ingested, or for data already resident in the data store). The data store can store the original data along with the results of the first phase analysis (such as whether a data item or portion of a data item has been classified as containing sensitive data by the first phase analysis). At a later time, the second phase analysis can be executed, such as when the data in the data store is being accessed, for example.

In some use cases, data owners might have different requirements for redacting different subsets of sensitive data, depending on who is accessing that data. For example, the data owners might require that some users only access fully redacted data, while other users can access fully unredacted data, while other users can access data with certain types of sensitive data redacted, and certain types of sensitive data unredacted. In some of these embodiments, data owners must store the raw data in a certain storage location, and the data owners can employ the disclosed hierarchical system and method for identifying sensitive content in data at extraction time. In other embodiments, the data owners might have already executed either the first phase analysis, or both the first and second phase analysis, and have stored the results of either one or both of those analysis either with the data in the data store, or separately from the data. When the data is accessed, the phases that were run previously do not have to be run again, and the results of the phases can be used to present the data in its required format, with the required redactions. However, if only the first phase analysis was executed previously, then the second phase analysis would need to be executed at some point before the location of sensitive data could be known. In other embodiments, a data owner might have a separate data store with at least some of the sensitive data redacted.

The disclosed hierarchical system and method for identifying sensitive content in data can be applicable to a wide range of use cases. Wherever a data flow is implemented (such as on a server or a system of servers), it can be expanded to use the disclosed hierarchical system and method for identifying sensitive content in data, in some embodiments. Therefore the disclosed system does not have to simply be limited to data storage. The above disclosed use cases are not an exhaustive list of use cases, and there can be any number of other use cases for the presented hierarchical system and method for identifying sensitive content in data. For example, wherever this specification discloses redacting sensitive data, the sensitive data might, in a similar manner, be tokenized or highlighted instead of being redacted. The disclosed hierarchical system and method for identifying sensitive content in data can be embedded in any system or systems that deal with data. The use cases presented here constitute some preferred embodiments, but there are many other situations where the presented hierarchical system and method for identifying sensitive content in data can be used, and the use cases presented here should not be considered definitive or exhaustive.

In certain embodiments, a client or a data owner might use the disclosed hierarchical system and method for identifying sensitive content in data across a wide variety and types of data and data systems. The disclosed system can be applied across multiple different data systems, in some embodiments. For example, a client or data owner might have a large data stream, database data, file data, log data, IoT data, and/or data warehouse data, and the disclosed hierarchical system and method for identifying sensitive content in data can be used across some or all of the data, whether the data is on premises or located externally, such as in a provider network. The disclosed hierarchical system and method for identifying sensitive content in data does not have to operate on one collocated set of data. The disclosed hierarchical system and method for identifying sensitive content in data can operate within or upon multiple data sites and/or multiple data services. The discloses system can operate on data in storage, or data in-flight, depending on the embodiment.

Data Security

The first phase identifies data items or portions of data items which require further analysis in the second phase. Those data items or portions of data items are sent over a wider-scale network, which might even include the public Internet, for a further analysis of the second phase. Maintaining security on the transfer is important, in some embodiments, since the data being transferred is data which have been classified as potentially containing PII (such as within a probability threshold). The data needs to be well protected, in these embodiments. Regardless of whether the data transfer occurs within a provider network entirely, or occurs in between a remote premise (such as a client's or data owner's location) and the provider network, or occurs in between two different networks, it is important to ensure that the networking is established so that unencrypted data is not transferred over a public network, such as the public Internet, in some embodiments. In other embodiments, networking is configured so that there is no transfer at all over a public network.

Transferring this data in a provider network can use the functionality of a virtual private cloud ("VPC"), in some embodiments. A virtual private cloud can be a provisioned logically isolated section of the provider network, where a user or client can launch provider network resources in a virtual network that the user or client might define. Transferring data between the first phase and second phase can involve VPC peering, in some embodiments. In other embodiments, transferring the data in a provider network can more generally involve the use of private networks, or virtual private networks. A VPC or private network can encompass a data store and/or a data storage service, in some embodiments. In some of these embodiments, the VPC or private network can also encompass the phase one analysis components, such as the sensitive data classifiers, that perform the classification of the data items (or portion of data items). The phase two analysis component or service (such as the sensitive data discovery component or service) might be located in a separate VPC or private network. Between the two VPCs or between the two private networks, the system can utilize VPC peering, or private network peering, in some embodiments. This can allow the traffic between the two VPCs, or two private networks, to be routed within the provider network.

A similar technique can be adapted between an external network, such as an on-premise installation, and a provider network. The external network can utilize a VPC or private network that can comprise a data store and/or a data storage service, in some embodiments. In some of these embodiments, the VPC or private network can also encompass the phase one analysis components, such as the sensitive data classifiers, that perform the classification of the data items (or portion of data items). The phase two analysis component or service (such as the sensitive data discovery component or service) can be located in a separate VPC or private network in the provider network. Between the two VPCs or between the two private networks (such as the first VPC or private network being located in the external network, and the second VPC or private network located in the provider network), the system can utilize VPC peering, or private network peering, in some embodiments. In other embodiments, the system can utilize a TLS connection or virtual private network ("VPN") type connection. This can allow the traffic between the two VPCs, or two private networks, to be routed securely from the external network to the provider network.

Regardless of the networking configuration, the disclosed hierarchical system and method for identifying sensitive content in data can also ensure that data transferred between two entities is encrypted, in some embodiments. In some of these embodiments, the system might use TLS 1.2 encryption. For example, data transferred between the phase one components and the phase two components can be encrypted. This can be, for example, data transferred from a data storage service to the sensitive data discovery component or service, or data transferred between the sensitive data classifiers and the sensitive data discovery component or service. This might also include data transferred between a data storage service (or file storage service, or streaming service, etc.) and the phase one analysis component(s), such as the sensitive data classifiers. If the storage service and the phase one analysis component(s) are not located in the same secure network, for example, or to prevent an internal unauthorized eavesdropper or hacker from accessing the data as it is being transferred, then data between these two entities might be encrypted as well, in some embodiments. In some embodiments, therefore, raw unencrypted data does not transfer over a network that would allow unauthorized access to the data.

Regardless of the encryption utilized, the disclosed hierarchical system and method for identifying sensitive content in data can also ensure that the receiving component or system is authorized to access the data that it is being provided, in some embodiments. Whatever entity is attempting to access, requesting to access, or being provided the data needs the right credentials to have permission to access or receive the data, in some embodiments. If the system is located entirely in the provider network, for example, an authorization service of the provider network can ensure that the classifiers, services and/or components of the system are each authorized to access the appropriate data. If the phase one components (such as the sensitive data classifiers) are located external to the provider network, for example, then the provider network might need to authorize the source of the phase 1 data and/or the external source of the phase 1 data might need to authorize the phase 2 service to receive the data, in some embodiments. Any destination of the data might also need to be authorized, in some embodiments. For example, any data redaction service, tokenization service, highlight service, tracking service, and/or user-specified destination of the data might need to be authorized by the provider of the data, such as the sensitive data discovery component of phase 2 of the system, to receive the data of output by phase 2. There are many more contexts where authorization can be used in the disclosed hierarchical system and method for identifying sensitive content in data, and the foregoing are merely some examples.

Embodiments of a Hierarchical System and Method for Identifying Sensitive Content in Data FIG. 1 is a logical block diagram illustrating a hierarchical system and method for identifying sensitive content in data comprising a storage system 100 with a sensitive data classifier 130 that classifies data items 120 containing sensitive data, and a sensitive data discovery component 140 that identifies a location of sensitive data within the received data items, according to some embodiments. In the embodiment of FIG. 1, the sensitive data discovery component 140 includes a data item receiver 160 that obtain the data items 135 classified by the sensitive data classifiers as containing the sensitive data. In the embodiment of FIG. 1, the sensitive data discovery component 140 also includes a sensitive data location analyzer 170 that performs a sensitive data location analysis on the data items 135 to identify a location of the sensitive data, distinct from non-sensitive data, within the data items 135. In the embodiment of FIG. 1, the sensitive data discovery component 140 also includes a generator of location information for the sensitive data 180 that generates location information for the sensitive data within the data items 135. In the embodiment of FIG. 1, the sensitive data discovery component 140 also includes a data item data store 150 that can temporarily store data items 135, received from the sensitive data classifier 130, that are classified as including sensitive data.

In some embodiments, a sensitive data discovery component 140, as well as any number of other possible services, operates as part of a service provider network (not shown in FIG. 1). However, the sensitive data discovery component 140 does not necessarily need to operate within a provider network, and can operate in a non-provider network client-server situation, or as simply software or an application running on one or more computers of a user or client, or in various other configurations that do not include provider networks, in some embodiments. In the embodiments that include a provider network, the services of the provider network can comprise one or more software modules executed by one or more electronic devices at one or more data centers and geographic locations, in some embodiments. Client(s) and/or edge device owner(s) using one or more electronic device(s) (which may be part of or separate from the service provider network) can interact with the various services of the service provider network via one or more intermediate networks, such as the internet. In other examples, external clients or internal clients can interact with the various services programmatically and without human involvement.

A provider network provides clients with the ability to utilize one or more of a variety of types of computing-related resources such as compute resources (for example, executing virtual machine (VM) instances and/or containers, executing batch jobs, executing code without provisioning servers), data/storage resources (for example, object storage, block-level storage, data archival storage, databases and database tables, etc.), network-related resources (for example, configuring virtual networks including groups of compute resources, content delivery networks (CDNs), Domain Name Service (DNS)), application resources (for example, databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The clients (or "customers") of provider networks may utilize one or more user accounts that are associated with a client account, though these terms may be used somewhat interchangeably depending upon the context of use. Clients and/or edge device owners may interact with a provider network across one or more intermediate networks (for example, the internet) via one or more interface(s), such as through use of application programming interface (API) calls, via a console implemented as a website or application, etc. The interface(s) may be part of, or serve as a front-end to, a control plane of the provider network that includes "backend" services supporting and enabling the services that may be more directly offered to clients.

To provide these and other computing resource services, provider networks often rely upon virtualization techniques. For example, virtualization technologies may be used to provide clients the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a client may directly utilize a compute instance (e.g., provided by a hardware virtualization service) hosted by the provider network to perform a variety of computing tasks. Additionally, or alternatively, a client may indirectly utilize a compute instance by submitting code to be executed by the provider network (e.g., via an on-demand code execution service), which in turn utilizes a compute instance to execute the code—typically without the client having any control of or knowledge of the underlying compute instance(s) involved.

As indicated above, service provider networks have enabled developers and other users to more easily deploy, manage, and use a wide variety of computing resources, including databases. The use of a database service, for example, enables clients to offload many of the burdens of hardware provisioning, setup and configuration, replication, clustering scaling, and other tasks normally associated with database management. A database service further enables clients to scale up or scale down tables' throughput capacity with minimal downtime or performance degradation, and to monitor resource utilization and performance metrics, among other features. Clients can easily deploy databases for use in connection with a wide variety of applications such as, for example, online shopping carts, workflow engines, inventory tracking and fulfillment systems, and so forth.

Referring back to FIG. 1, the sensitive data classifiers 130, can be collocated with where the data is stored in data collection(s) 110, in some embodiments, such that the first phase provides a local analysis. In some embodiments, the initial phase one classifier 130 can be executed on the storage host for the storage system 100 itself, in some embodiments. In other embodiments, the phase one classifier 130 can be hosted in close network proximity to the storage system 100 so that the data stays within some kind of defined network security boundary, and so that data does not have to be sent over a long distance. In other embodiments, the phase one analysis 130 might be provided by an event-driven compute service as the data is transferred to or stored in a data storage system. The hosting of the first phase implementation can be organized so that data transfer across the boundaries of a service or data center is not required, in some embodiments. The processing can be lightweight and can be either be embedded with a data storage system 100 or service, or can be located in close proximity with the data storage service or system 100 such that the data transfer cost is eliminated, depending on the embodiment.

Collocating the preliminary analysis 130 with the data storage system 100 or service, as shown in FIG. 1, provides both increased efficiency of the compute services, as well as increased security for the data itself. The increased security can be provided by eliminating one or more boundaries across which the sensitive data must traverse, in some embodiments. The increased efficiency can be provided eliminating the need of processing a large percentage of the non-sensitive data through a more expensive model 170, as well as eliminating the need to transmit large quantities of data across networks, and/or across the boundary of services and entities.

In a provider network environment, the data might be stored in a data storage service of the provider network. The phase one analysis, such as the sensitive data classifier 130, can be collocated with the provider network's data storage system 100, so that entirety of the data does not have to leave the context of the data storage system 100, in some embodiments. However, in other embodiments, the data might be stored on the systems of a client of the provider network, such that the client performs a phase one analysis before sending identified data items (or identified portions of data items) to the provider network for more comprehensive second phase analysis.

The phase one analysis can employ a simpler, lightweight type model, in some embodiments. The phase one model can be fairly lightweight so as to not impact the performance of the storage system 100, since, in some embodiments, phase one is collocated with the storage system 100 itself. The phase one analysis, such as provided by the sensitive data classifiers 130, might simply output an indication whether the data item contains sensitive data somewhere within the data item, within a certain probability threshold. Phase one, at a high level, can be viewed as a classification task, in some embodiments, where for every data item (or portion of a data item) being analyzed, a decision is made whether sensitive data is, or might be, contained within that data item (or portion of a data item). Phase one might simply add an extra layer of lightweight computing at the storage service, so that large quantities of data is not transmitted outside the storage service (such as being transmitted to a larger network or provider network).

The second phase analysis of the disclosed hierarchical system and method for identifying sensitive content in data, shown as the sensitive data discovery component 140 in FIG. 1 can be a more comprehensive analysis, in some embodiments. The second phase analysis can be a strong tagger or sequence tagger, in some embodiments. The second phase analysis might examine every portion of text very carefully, and attempt to tag where the sensitive data or PII is located in the particular portion of data, in some of these embodiments. The second phase analysis is usually not performed by simple techniques. Rather, the second phase analysis requires a sophisticated classifier with a fairly high percentage accuracy, in some preferred embodiments. The second phase analysis can specifically identify the exact character strings in the data that are sensitive data, in some of these embodiments. The second phase analysis utilize a sensitive data location analyzer 170 to identify tokens of input text that belong to one of sensitive data types, in some embodiments. These sensitive data types might be a name, social security number, credit card number, or other kinds of personally identifiable information, for example.

The second phase analysis, shown as the sensitive data discovery component 140 can be computationally heavy, and can require a dedicated fleet of compute servers (or accelerated instances) to be able to process large amount of data, in some embodiments. Because the second phase analysis can require a fleet of compute instances or server, in some embodiments, it is hard to impossible to collocate the model with data storage system 100. Therefore, the sensitive data discovery component 140 is separate from the data storage 100 and the first phase analysis of the sensitive data classifier 130 in the embodiment shown in FIG. 1.

Figure 2:
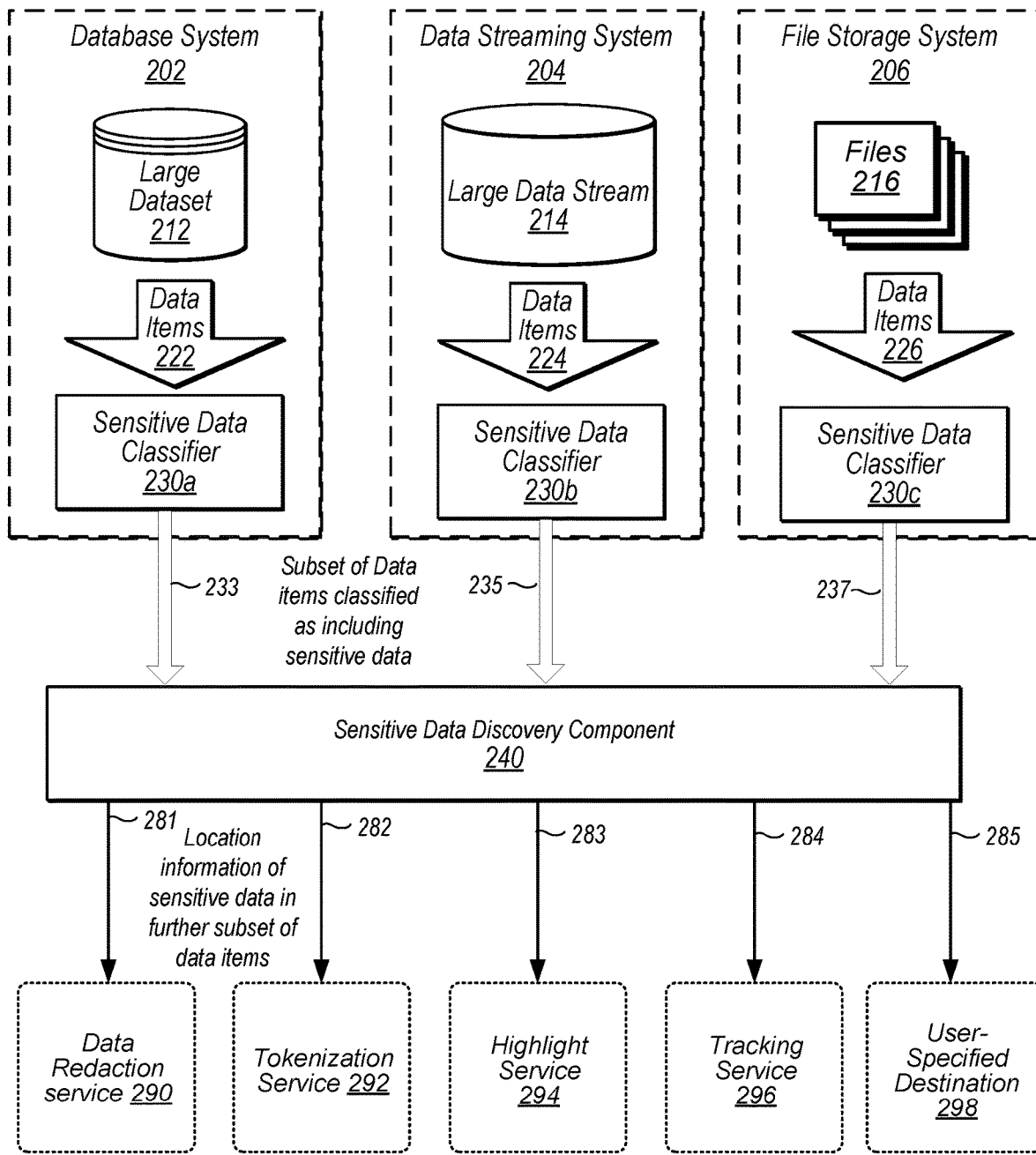
FIG. 2 is a logical block diagram further depicting contents of a hierarchical system and method for identifying sensitive content in data comprising sensitive data classifiers that operate on a large number of data items from their respective data sources, and a sensitive data discovery component that operates of a subset of data items classified as including sensitive data, where location information of sensitive data can be provided to various different destinations, according to some embodiments.

FIG. 2 is a logical block diagram further depicting contents of a hierarchical system and method for identifying sensitive content in data comprising sensitive data classifiers 230*abc* that operate on a large number of data items 222, 224, 226, from their respective data sources 212, 214, 216, and a sensitive data discovery component 240 that operates of a subset of data items 233, 235, 237, classified as including sensitive data, where location information of sensitive data 281, 282, 283, 284, 285 can be provided to various different destinations, according to some embodiments.

FIG. 2 depicts three different use cases for the presented hierarchical system and method for identifying sensitive content in data, according to some embodiments. One use case can be with a database system 202. Either as data is being stored a large dataset 212, or for data already stored the large dataset 212, a local phase one analysis, such as the sensitive data classifier 230*a*, can classify data items 222 of the large dataset 212 that contain sensitive data, or might contain sensitive data, or that contain sensitive data within a probability threshold. These classified data items 233 can be sent to a separate sensitive data discovery component 240 for a more detailed analysis.

Another use case can be with files 216 in a file storage system 206 that operates in a similar manner. Either as files are being stored a file storage system 206, or for files 216 already stored in the file storage system 206, a local phase one analysis, such as the sensitive data classifier 230*c*, can classify data items 226 of the files 216 that contain sensitive data, or might contain sensitive data, or that contain sensitive data within a probability threshold. These classified data items 237 can be sent to a separate sensitive data discovery component 240 for a more detailed analysis.

Another use case is with streaming data, where phase one can be implemented within the stream 214 so that the classification is done as data 224 goes through the stream 214. A local phase one analysis, such as the sensitive data classifier 230*b*, can classify data items 224 of the large data stream 214 that contain sensitive data, or might contain sensitive data, or that contain sensitive data within a probability threshold. The portions of the data items 235 which are classified as containing sensitive data (or might contain sensitive data, or that contain sensitive data within a probability threshold) are sent to phase two, such as a separate sensitive data discovery component 240 for a more detailed analysis, in some embodiments. Other use cases not shown in FIG. 2 can be a log data service that stores log data, IoT devices and the data they store, or an IoT device service that operates on data from multiple IoT devices, depending on the embodiment.

More generally, with any type of data, the first phase analysis, such as the sensitive data classifiers 230*abc*, might be part of the system that encompasses the data, such as the database system 202, data streaming system 204, and file storage system 206. For example, sensitive data classifiers 230*ac* might be provided by a data storage service 202, 206 of a provider network, or might be a separate service that operates local to, or in close network proximity to, the data storage service 204, 206 of a provider network.

The output of the second phase analysis (such as output by a sensitive data discovery component 240) can be the original data with the sensitive data marked in some way, in some embodiments. This output can be in addition to, or instead of, the second phase analysis's output of a data location identifier of the sensitive data 281, 282, 283, 284, 285, depending on the embodiment. Else the location information of sensitive data in the further subset of the data items 281, 282, 283, 284, 285 can be output to separate services to perform specific functions. These services can be data redaction service 290, a tokenization service 292, a highlight service 294, a tracking service 296, or a user-specified destination 298. These services might be external to the sensitive data discovery component 240, or one or more services might be internal to the sensitive data discovery component 240, depending on the embodiment.

The sensitive data discovery component 240 can receive data as an input 233, 235, 237, and output data as an output, where the output contains the sensitive data replaced with something else. This something else can be whatever the user or client requests, in some embodiments. For example, the sensitive data might be redacted by a data redaction service 290, or tokenized by a tokenization service 292, or highlighted by a highlighting service 294, or sent to a tracking service 296, or sent to any other user-specified destination 298, depending on the embodiment. The sensitive data might be replaced with a mask, such as a series of "*" characters, in some embodiments. The sensitive data might be replaced with a type of entity, in some embodiments. For example, a person's name in the data might be simply replaced with the characters "(PERSON)", either in parenthesis or without the parenthesis. As another example, a credit card number might be replaced with the characters "CREDIT CARD NUMBER" in the data.

Figure 3:
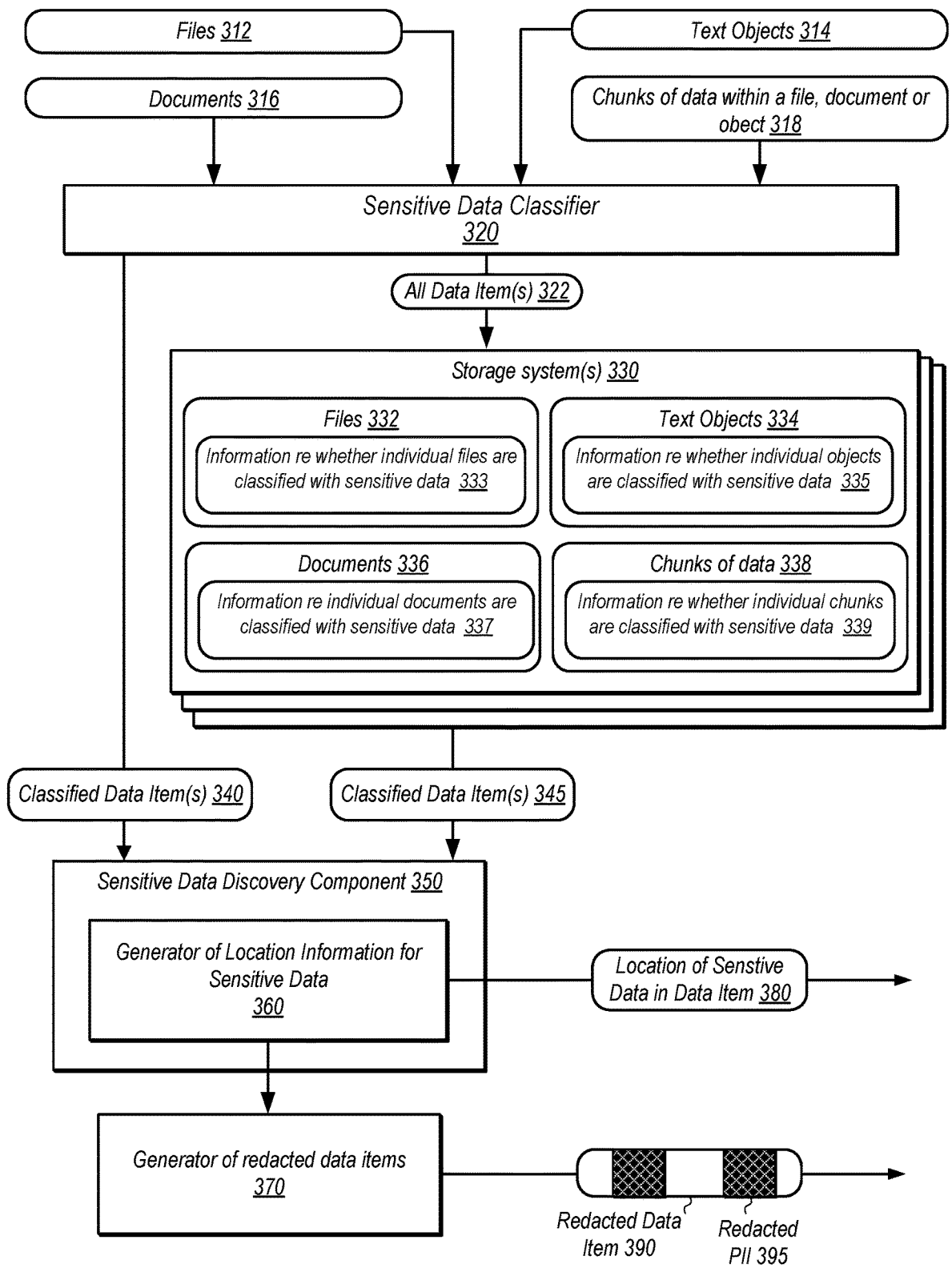
FIG. 3 is a logical block diagram illustrating various types of data input and output by various components of a hierarchical system for identifying sensitive content in data, including a sensitive data classifier, a storage system(s), and a sensitive data discovery component, according to some embodiments.

FIG. 3 is a logical block diagram illustrating various types of data input and output by various components of a hierarchical system for identifying sensitive content in data, including a sensitive data classifier 320, a storage system(s) 330, and a sensitive data discovery component 350, according to some embodiments. In the embodiments disclosed in FIG. 3, the sensitive data classifier 320 can receive data inputs such as files 312, documents 316, text objects 314, and/or chunks of data 318 within a file, document or text object. The sensitive data classifier 320 can analyze these data items, and classify at least some of the data items as containing sensitive data, based at least in part on the analysis. The sensitive data classifier 320 might then send all the data items 322 that it receives to a storage system(s) 330.

The storage system(s) 330 can store the files 332, text objects 334, documents 336, and/or chunks of data 338. In addition to this, the storage system(s) 330 can also store information regarding any data item (or portion of a data item was classified with sensitive data by the sensitive data classifier 320. For example, the storage system(s) 330 can store information regarding whether individual files were classified with sensitive data 333 along with the stored files 332. The storage system(s) 330 might also store information regarding whether individual objects were classified with sensitive data 335 along with the text objects 334. The storage system(s) 330 might also store information regarding whether individual documents were classified with sensitive data 337 along with the documents 336. The storage system(s) 330 might also store information regarding whether individual chunks of data were classified with sensitive data 339, along with the chunks of data 338.

In addition, or instead of, sending all data items 322 to the storage system(s) 330, the sensitive data classifier 320, can also provide the classified data item(s) 340 to the sensitive data discovery component 350. The sensitive data discovery component 350 might also obtain the classified data item(s) 345 from the storage system(s) 330 in addition to, or instead of, obtaining the classified data item(s) 340 from the sensitive data classifier 320. However, the sensitive data discovery service 350 obtains the classified data item(s) 340, 345, it can perform a sensitive data location analysis on the obtained data items to identify a location of the sensitive data distinct from non-sensitive data within the obtained data items. The sensitive data discovery component 350 can then generate location information 380 for the sensitive data within the data items using the generator of location information for sensitive data 360. This location information can be sent to a specified destination.

As a further embodiment, the sensitive data discovery component 350 can send location information 380 for the sensitive data within the data items, as well as the data items themselves, to a generator of redacted data items 370. The generator of redacted data items 370 can obtain the data items from the sensitive data discovery component 350, or it can obtain the data items from another source, such as the storage system(s) 330. The generator of redacted data items 370 can generate a redacted data item 390 where sensitive data, or PII, is redacted from the data item as redacted PII 395. This redacted data item can be sent to a specified destination, such as returned to the storage system(s) 330 or sent to another storage system, depending on the embodiment.

Figure 4:
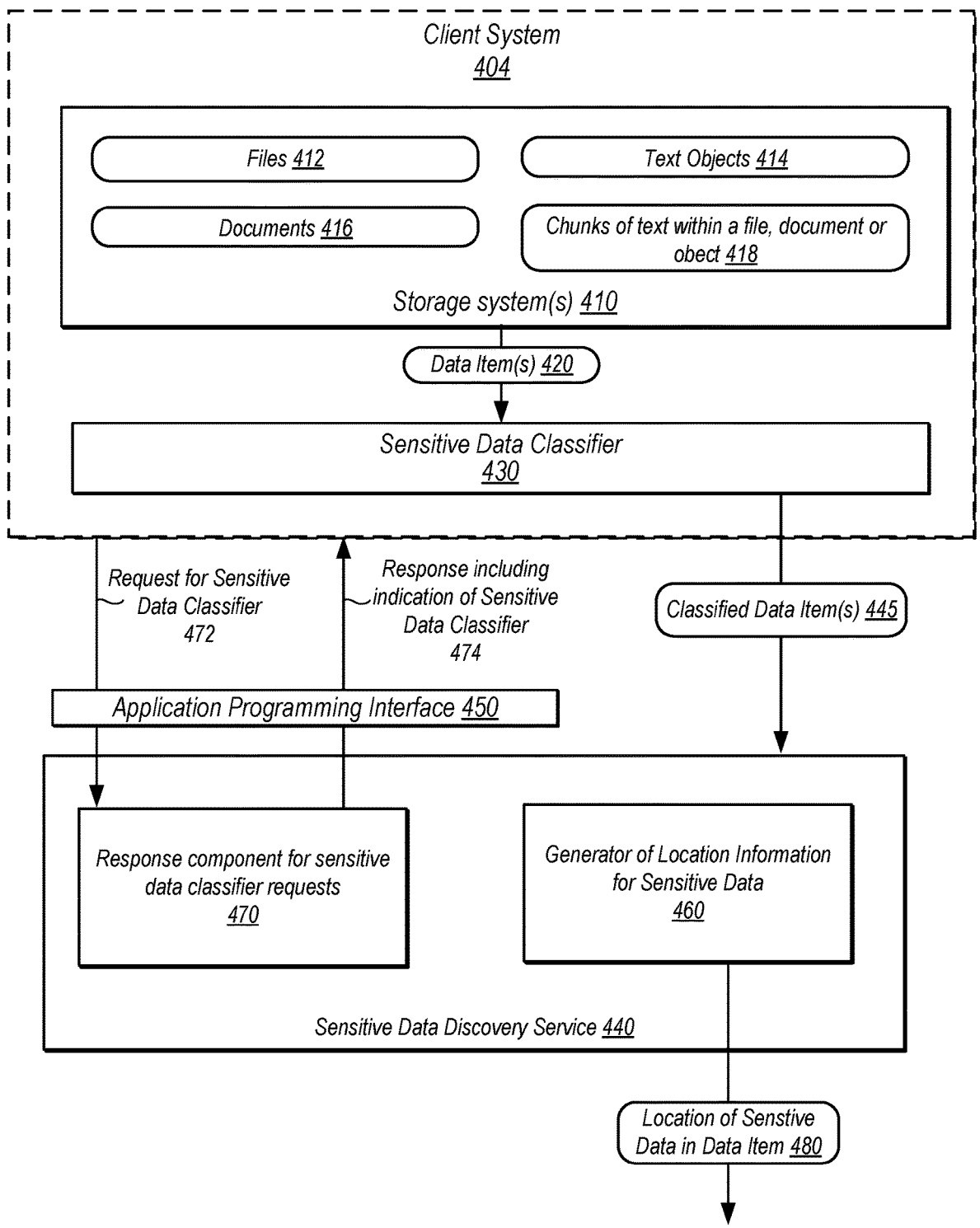
FIG. 4 is a logical block diagram illustrating a client system requesting a sensitive data classifier from a sensitive data discovery service, receiving a response including an indication of the sensitive data classifier, and the requested sensitive data classifier classifying data items in a storage system and transmitting those data items to the sensitive data discovery service to determine location information for the sensitive data, according to some embodiments.

FIG. 4 is a logical block diagram illustrating a client system 404 requesting 472 a sensitive data classifier from a sensitive data discovery service 440, receiving a response 474 including an indication of the sensitive data classifier, and the requested sensitive data classifier 430 classifying data items 420 in a storage system 410, and transmitting those classified data items 445 to the sensitive data discovery service 440 to determine location information for the sensitive data 480, according to some embodiments.

The sensitive data classifier 430 might be part of a storage service where data is stored, or as depicted in FIG. 4 it could be a provided executable package that is provided in response 474 to a request 472, and that is deployed locally by a client at its own client system 404, for example. In some of these embodiments, the provider network might provide 474 the phase one analysis model to the client, such as in an executable package, for the client to perform the phase one analysis, before sending the identified or classified data 445 to the provider network for the phase two analysis of the sensitive data discovery service 440. In other embodiments, phase one might be provided 474 as library or a container that can be, for example, dropped into the client system's 404 workflow.

In some embodiments, the phase one analysis model, which can be embodied in a sensitive data classifier 430, might be a trained machine learning model. The machine learning model might be trained to identify whether data items (or portions of data items) contain sensitive data somewhere within the data item, within a certain probability threshold for example. For the embodiments in which a service 440 or provider network provides 474 the phase one to clients 404, all the clients might be provided the same model, in some embodiments, while in other embodiments at least some clients might be provided different models. In some embodiments, a client 404 might be provided phase one software, such as a sensitive data classifier 430, comprising a machine learning model trained specifically for that client 404, such as using data 412, 414 416 418 from the client 404 in the training of the model. The machine learning model provided to a client can be customized for particular client cases, in some embodiments.

In some embodiments, a client might deploy the first phase model locally to identify the data that needs to be sent to an external component or service, such as the sensitive data discovery service 440, for a more detailed analysis. For example, the sensitive data classifier 430 can comprise a client-side library that the data storage service uses in order to make the decision that some portions of the data might comprise sensitive data, and therefore might require further processing to determine if sensitive data is present in a portion of the data. That client-side library can be part of the data storage system 410, in some embodiments. In other embodiments, the client-side library can be a hosted service that is associated with the data storage service. The hosting of the first phase implementation can be organized so that data transfer across the boundaries of a service or data center is not required, in some embodiments. The processing can be lightweight and can be either be embedded with a data storage system 410 or service, or can be located in close proximity with the data storage service such that the data transfer cost is eliminated, depending on the embodiment.

Figure 5:
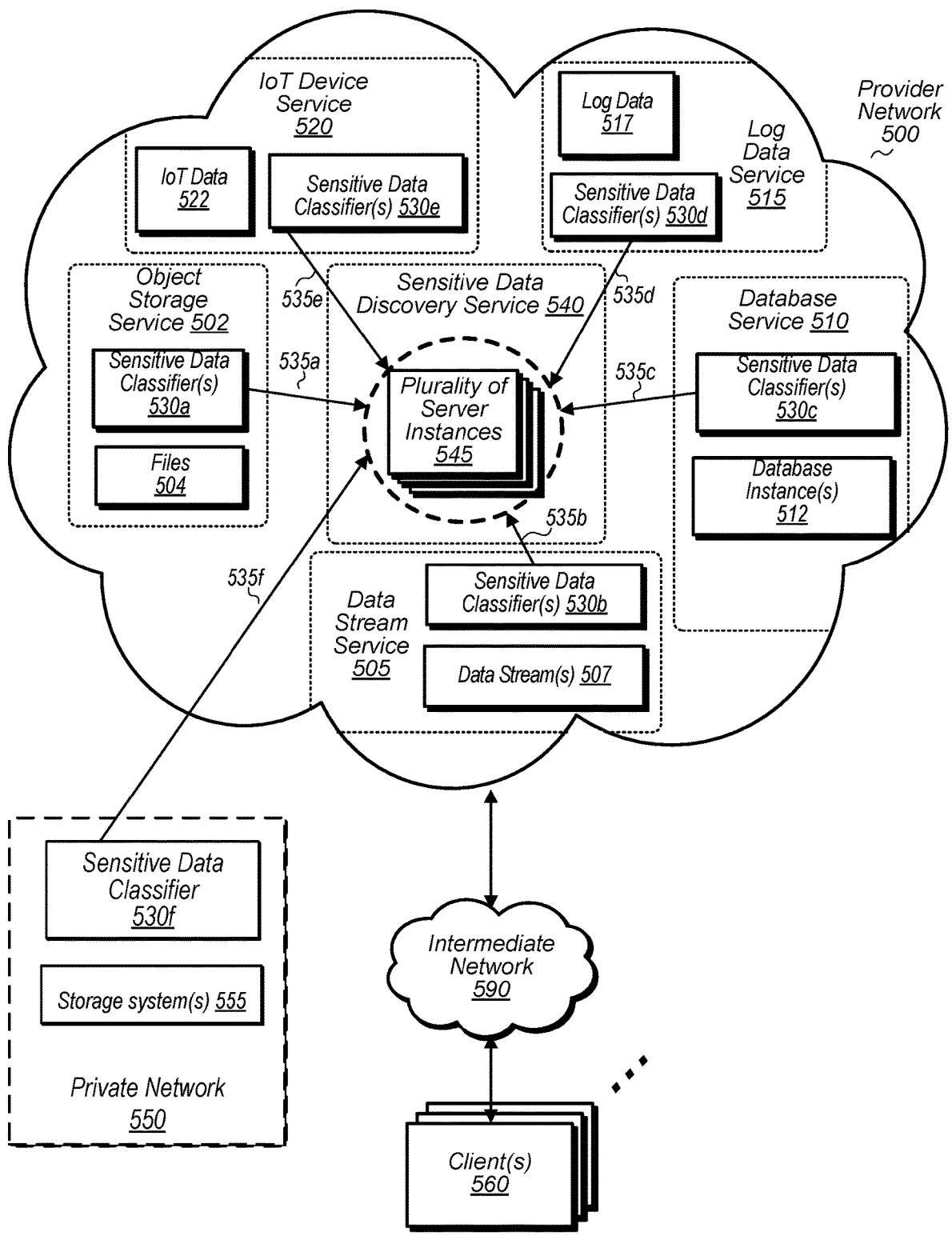
FIG. 5 illustrates an example provider network environment for the hierarchical system and method for identifying sensitive content in data, where the sensitive data classifiers are implemented as part of an IoT device service, a log data service, an object storage service, a database service, a data stream service, and/or an external private network, and where the sensitive data discovery service is implemented by a compute server instances of the provider network, according to some embodiments.

The Hierarchical System and Method for Identifying Sensitive Content in Data in a Provider Network FIG. 5 illustrates an example provider network 500 environment for the hierarchical system and method for identifying sensitive content in data, where the sensitive data classifiers 530a-f are implemented as part of an IoT device service 520, a log data service 515, an object storage service 502, a database service 510, a data stream service 505, and/or an external private network 550, and where the sensitive data discovery service 540 is implemented by a compute server instances 545 of the provider network 500, according to some embodiments.

A service provider network 500 may provide computing resources (545) via one or more computing services or event-driven computing services to a client(s) 560 via a programmatic interface through an intermediate network 590, in some embodiments. The service provider network 500 may be operated by an entity to provide one or more services, such as various types of cloud-based computing or storage services, accessible via the Internet and/or other networks to client(s). In some embodiments, the service provider network 500 may implement a web server, for example hosting an e-commerce website. Service provider network 500 may include numerous data centers hosting various resource pools, such as collections of physical and/or virtualized computer servers, storage devices, networking equipment and the like, needed to implement and distribute the infrastructure and services offered by the service provider network 500. In some embodiments, service provider network may employ computing resources (545) for its provided services. These computing resources may in some embodiments be offered to client(s) in units called "instances," such as virtual compute instances.

A provider network 500 may provide resource virtualization to clients via one or more virtualization services that allow clients to access, purchase, rent, or otherwise obtain instances of virtualized resources, including but not limited to computation (545) and storage resources, implemented on devices within the provider network or networks in one or more data centers. The storage services can include an object storage service 502 that stores files 504, a data stream service 505 that operates on data streams 507, a database service 510 that stores database instances 512, a log data service 515, that stores log data 517, and/or an Internet of Things ("IoT") Service that collects and stores IoT data 522 from external IoT devices. Each of these storage services can include one or more local sensitive data classifier(s) 530a-f that classify data items as containing sensitive data. These locally sensitive classifiers can provide the classified data items 535a-f to a separate sensitive data discovery component 540.

In some embodiments, private IP addresses may be associated with the resource instances. The private IP addresses can be the internal network addresses of the resource instances on the provider network 500. In some embodiments, the provider network 500 may also provide public IP addresses and/or public IP address ranges (e.g., Internet Protocol version 4 (IPv4) or Internet Protocol version 6 (IPv6) addresses) that clients may obtain from the provider 501.

Conventionally, the provider network 500, via the virtualization services, may allow a client of the service provider to dynamically associate at least some public IP addresses assigned or allocated to the client with particular resource instances assigned to the client. The provider network 500 may also allow the client to remap a public IP address, previously mapped to one virtualized computing resource instance allocated to the client, to another virtualized computing resource instance that is also allocated to the client. Using the virtualized computing resource instances and public IP addresses provided by the service provider, a client of the service provider may, for example, implement client-specific applications and present the client's applications on an intermediate network, such as the Internet. Either the clients or other network entities on the intermediate network may then generate traffic to a destination domain name published by the clients. First, either the clients or the other network entities can make a request through a load balancer for a connection to a compute instance in the plurality of compute instances (545).

A load balancer might responds with the identifying information which might include a public IP address of itself. Then the clients or other network entities on the intermediate network may then generate traffic to public IP address that was received by the router service. The traffic is routed to the service provider data center, and at the data center is routed, via a network substrate, to the private IP address of the network connection manager currently mapped to the destination public IP address. Similarly, response traffic from the network connection manager may be routed via the network substrate back onto the intermediate network to the source entity.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance. Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all a resource instance types.

At least some public IP addresses may be allocated to or obtained by clients 560 of the provider network 500. A client 560 may then assign their allocated public IP addresses to particular resource instances allocated to the client. These public IP addresses may be referred to as client public IP addresses, or simply client IP addresses. Instead of being assigned by the provider network 500 to resource instances as in the case of standard IP addresses, client IP addresses may be assigned to resource instances by the clients, for example via an API provided by the service provider. Unlike standard IP addresses, client IP addresses are allocated to client accounts and can be remapped to other resource instances by the respective clients as necessary or desired. A client IP address is associated with a client's account, not a particular resource instance, and the client controls that IP address until the client chooses to release it. A client IP address can be an Elastic IP address. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

A provider network 500 may provide an object storage service 502 that stores files 504, a data stream service 505 that operates on data streams 507, a database service 510 that stores database instances 512, a log data service 515, that stores log data 517, and/or an Internet of Things ("IoT") Service that collects and stores IoT data 522 from external IoT devices. These services can be implemented by storage nodes and/or by physical server nodes. The sensitive data discovery service 540 also contains many other server instances (545) to perform a sensitive data location analysis on the obtained data items to identify a location of sensitive data text strings, distinct from the non-sensitive data text strings, within one or more of the data items. As another example, the provider network provides a virtualized data storage service or object storage service 502 which can include a plurality of data storage instances implemented by physical data storage nodes. The data storage service or object storage service 502 can store files 504 for the client, which are accessed through a file access by the appropriate server instance of the client. The provider network can also include multiple other client services that pertain to one or more clients or users. The provider network can implement a monitoring and observability service to, for example, monitor applications, respond to system-wide performance changes, optimize resource utilization, and/or get a unified view of operational health. As another example, the provider network 500 can include a data stream service 505 to clients or users. This data stream service 505 can include a data stream 507 that receives data from a client's data stream and delivers a stream of data to the data storage service, such as the object storage service 502, or the database service, 510 for use by the hierarchical system for identifying sensitive content in data. The clients may access any one of the client services 502, 505, 510, 515, 520, or 540 for example, via programmatic interface 599, such as one or more APIs to the service, to obtain usage of resources (e.g., data storage instances, or files, or database instances, or server instances) implemented on multiple nodes for the service in a production network portion of the provider network 500.

In addition, FIG. 5 illustrates the private network 550 that can be owned or operated by a client 560, for example. This private network 550 can include its own storage system(s) 555 and its own sensitive data classifier 530f. The sensitive data classifier 530f can classify at least some data items of the storage system 555 as containing the sensitive data text strings within a probability threshold, and can provide those data items 535f to the sensitive data discovery service 540, to perform its sensitive data location analysis on the data items.

Figure 6:
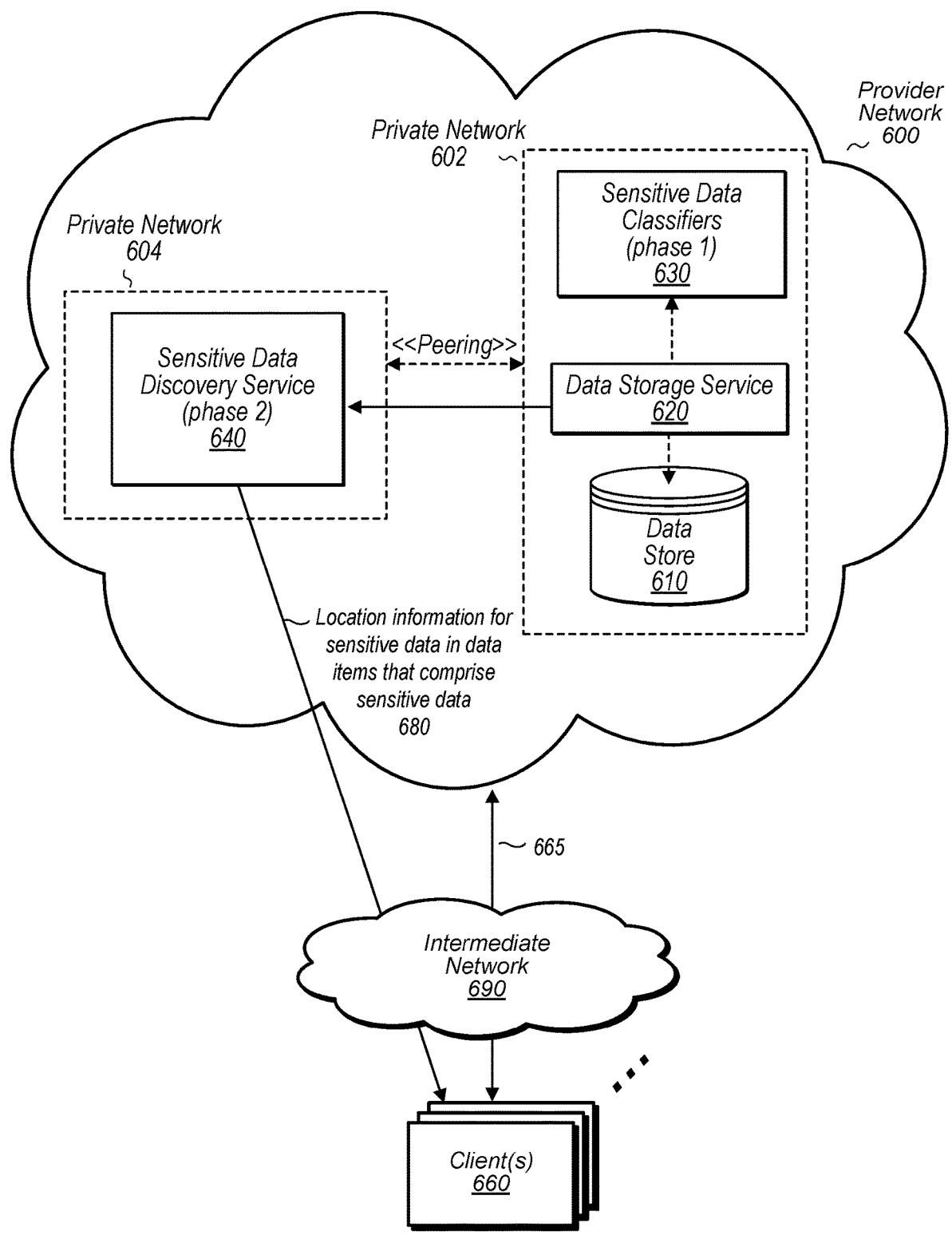
FIG. 6 is a block diagram illustrating an example networking configuration and communication of data between various components of a hierarchical system for identifying sensitive content in data within an example provider network environment, including a data storage service, sensitive data classifiers, and a sensitive data discovery service, according to some embodiments.

FIG. 6 is a block diagram illustrating an example networking configuration and communication of data between various components of a hierarchical system for identifying sensitive content in data within an example provider network 600 environment, including a data storage service 620, sensitive data classifiers 630, and a sensitive data discovery service 640, according to some embodiments.

The sensitive data classifiers 630 of the first phase can identify data items or portions of data items which require further analysis in the sensitive data discovery service 640 of a second phase, in some embodiments. Those data items or portions of data items are sent over a wider-scale network for a further analysis of the second phase. Maintaining security on the transfer is important, in some embodiments, since the data being transferred is data which have been classified as potentially containing PII (such as within a probability threshold). The data needs to be well protected, in these embodiments. It is important to ensure that the networking is established so that unencrypted data is not transferred over a the wider provider network.

Transferring this data in a provider network can use the functionality of a virtual private cloud ("VPC"), in some embodiments. A virtual private cloud can be a provisioned logically isolated section of the provider network, where a user or client can launch provider network resources in a virtual network that the user or client might define. Transferring data between the first phase and second phase can involve VPC peering, in some embodiments. In other embodiments, transferring the data in a provider network can more generally involve the use of private networks 602, 604, or virtual private networks. A VPC or private network 602 can encompass the data storage service 620 as well as the data store 610, in some embodiments. In some of these embodiments, the private network 602 can also encompass the phase one analysis components, such as the sensitive data classifiers 630, that perform the classification of the data items (or portion of data items). The phase two analysis component or service (such as the sensitive data discovery service 640) can be located in a separate VPC or private network 604. Between the two private networks 602 and 604, the system can utilize peering, in some embodiments. In other embodiments, the system can utilize a TLS connection or VPN type connection. This can allow the traffic between the two private networks to be routed within the provider network in a secure manner.

While not shown in FIG. 6, a similar technique can be adapted between an external network, such as an on-premise installation, and a provider network. The external network can utilize a VPC or private network that can comprise a data store and/or a data storage service, in some embodiments. In some of these embodiments, the VPC or private network can also encompass the phase one analysis components, such as the sensitive data classifiers, that perform the classification of the data items (or portion of data items). The phase two analysis component or service (such as the sensitive data discovery component or service) can be located in a separate VPC or private network in the provider network. Between the two VPCs or between the two private networks (the first VPC or private network being located in the external network, and the second VPC or private network located in the provider network), the system can utilize VPC peering, or private network peering, in some embodiments. In other embodiments, the system can utilize a TLS connection or VPN type connection. This can allow the traffic between the two VPCs, or two private networks, to be routed securely from the external network to the provider network.

Regardless of the networking configuration, the disclosed hierarchical system and method for identifying sensitive content in data can also ensure that data transferred between two entities is encrypted, in some embodiments. In some of these embodiments, the system might use TLS 1.2 encryption. For example, data transferred between the phase one private network 602 and the phase two private network 604 can be encrypted. This can be, for example, data transferred from a data storage service 620 to the sensitive data discovery service 640, or data transferred between the sensitive data classifiers 630 and the sensitive data discovery service 640. This might also include data transferred between a data storage service 620 (or file storage service, or streaming service, etc.) and the phase one analysis component(s), such as the sensitive data classifiers 630. If the storage service 620 and the classifier(s) 630 are not located in the same secure network, for example, or to prevent an internal unauthorized eavesdropper or hacker from accessing the data as it is being transferred, then data between these two entities might be encrypted as well, in some embodiments. In some embodiments, therefore, raw unencrypted data does not transfer over a network that would allow unauthorized access to the data.

Regardless of the encryption utilized, the disclosed hierarchical system and method for identifying sensitive content in data can also ensure that the receiving component or system is authorized to access the data that it is being provided, in some embodiments. Whatever entity is attempting to access, requesting to access, or being provided the data needs the right credentials to have permission to access or receive the data, in some embodiments. If the system is located entirely in the provider network 600, for example, an authorization service of the provider network can ensure that the classifiers 630, services 620, 630 and/or components 610 of the system are each authorized to access the appropriate data. If the phase one components (such as the sensitive data classifiers 530f) are located external to the provider network 500, for example, then the provider network might need to authorize the source of the phase 1 data (private network 550, for example) and/or the external source of the phase 1 data might need to authorize the phase 2 service 540 to receive the data, in some embodiments. Any destination of the data might also need to be authorized, in some embodiments. For example, any data redaction service 290, tokenization service 292, highlight service 294, tracking service 296, and/or user-specified destination 298 of the data might need to be authorized by the provider of the data, such as the sensitive data discovery component 240 of phase 2 of the system, to receive the data of output by phase 2. There are many more contexts where authorization can be used in the disclosed hierarchical system and method for identifying sensitive content in data, and the foregoing are merely some examples.

Illustrative Methods of Identifying Sensitive Content in Data Using a Hierarchy

Figure 7:
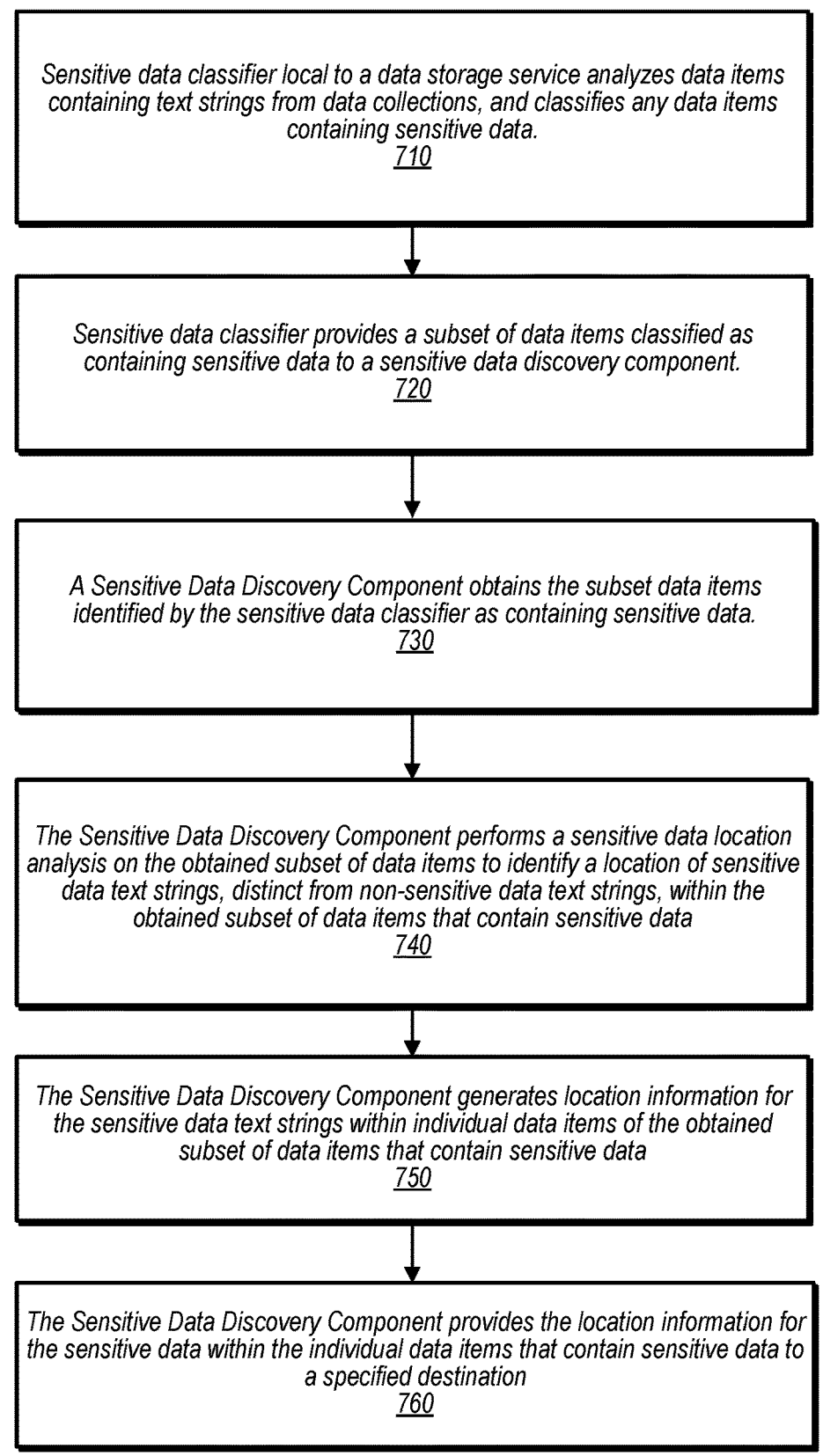
FIG. 7 is a high-level flow chart illustrating methods and techniques for identifying sensitive content in data using a hierarchical system or method, comprising actions taken by sensitive data classifiers and a sensitive data discovery service, according to some embodiments.

FIG. 7 is a high-level flow chart illustrating methods and techniques for identifying sensitive content in data using a hierarchical system or method, comprising actions taken by sensitive data classifiers and a sensitive data discovery service, according to some embodiments.

The flowchart begins at 710 in which sensitive data classifiers, local to a data storage service, analyze data items containing text strings from data collections, and classify any data items containing sensitive data. The flowchart transitions to block 720 in which sensitive data classifiers send a subset of data items classified as containing sensitive data to a sensitive data discovery component. The flowchart then transitions to 730 where a Sensitive Data Discovery Component obtains the subset data items identified by the sensitive data classifiers as containing sensitive data.

The remainder of the flowchart discloses the actions taken by the sensitive data discovery component. In block 740, the Sensitive Data Discovery Component performs a sensitive data location analysis on the obtained subset of data items to identify a location of sensitive data text strings, distinct from non-sensitive data text strings, within the obtained subset of data items that contain sensitive data. The flowchart transitions to block 750, where the Sensitive Data Discovery Component generates location information for the sensitive data text strings within individual data items of the obtained subset of data items that contain sensitive data. The flowchart finished at block 760 where the Sensitive Data Discovery Component provides the location information for the sensitive data, within the within individual data items that contain sensitive data, to a specified destination.

FIG. 8 is a high-level flow chart illustrating methods and techniques for identifying sensitive content in data using a hierarchical system or method, from the perspective of the sensitive data classifiers, which identify data items containing sensitive data, and provide the identified data items to a separate sensitive data discovery component, according to some embodiments.

The flowchart begins at block 810 where a sensitive data classifier, local to a data storage system, analyzes a plurality of data items either stored in the storage system, or as they are being ingested into the storage system. The sensitive data classifier then classifies a subset of data items as containing sensitive data within a probability threshold in block 820. The flowchart transitions to block 830 where a sensitive data classifier records which data items were classified as containing sensitive data. The flowchart ends at block 840 where the subset of data items classified as containing sensitive data, but not the other data items not classified as containing sensitive data, are provided to a separate a sensitive data discovery component to identify a location of sensitive data text strings within the data items. In some embodiments, only data items of a data collection identified by the one or more sensitive data classifiers as containing sensitive data are provided to the separate sensitive data discovery component, such that other data items of the data collection not identified as containing sensitive data are not transferred to the sensitive data discovery component.

FIG. 9 is a high-level flow chart illustrating methods and techniques for identifying sensitive content in data using a hierarchical system or method, from the perspective of the sensitive data discovery service, which provides the sensitive data classifiers to a remote destination, according to some embodiments. The flowchart begins at block 910 in which a sensitive data discovery service in a provider network obtains a request to provide a sensitive data classifier to a remote destination. Then the flowchart transitions to block 920 where an entity, such as the sensitive data discovery service, or a component of the sensitive data discovery service, provides a sensitive data classifier to a remote destination in accordance with the request, where the sensitive data classifier can analyze data items, and can identify which data items contain sensitive data text strings within a probability threshold.

Sometime later, the flowchart then executes block 930 which obtains the data items identified by the sensitive data classifier as containing sensitive data. Then the method performs a sensitive data location analysis on the obtained data items to identify a location of sensitive data within the obtained data items that contain sensitive data of block 940.

The flowchart transitions to block 950 which generates location information for the sensitive data text strings within individual data items of the obtained subset of data items that contain sensitive data. In block 960, the flowchart determines a specified destination for the location information for the sensitive data, possibly based on user input. The flowchart finishes in block 970 that provides the location information for the sensitive data to the specified destination.

Illustrative System

Figure 10:
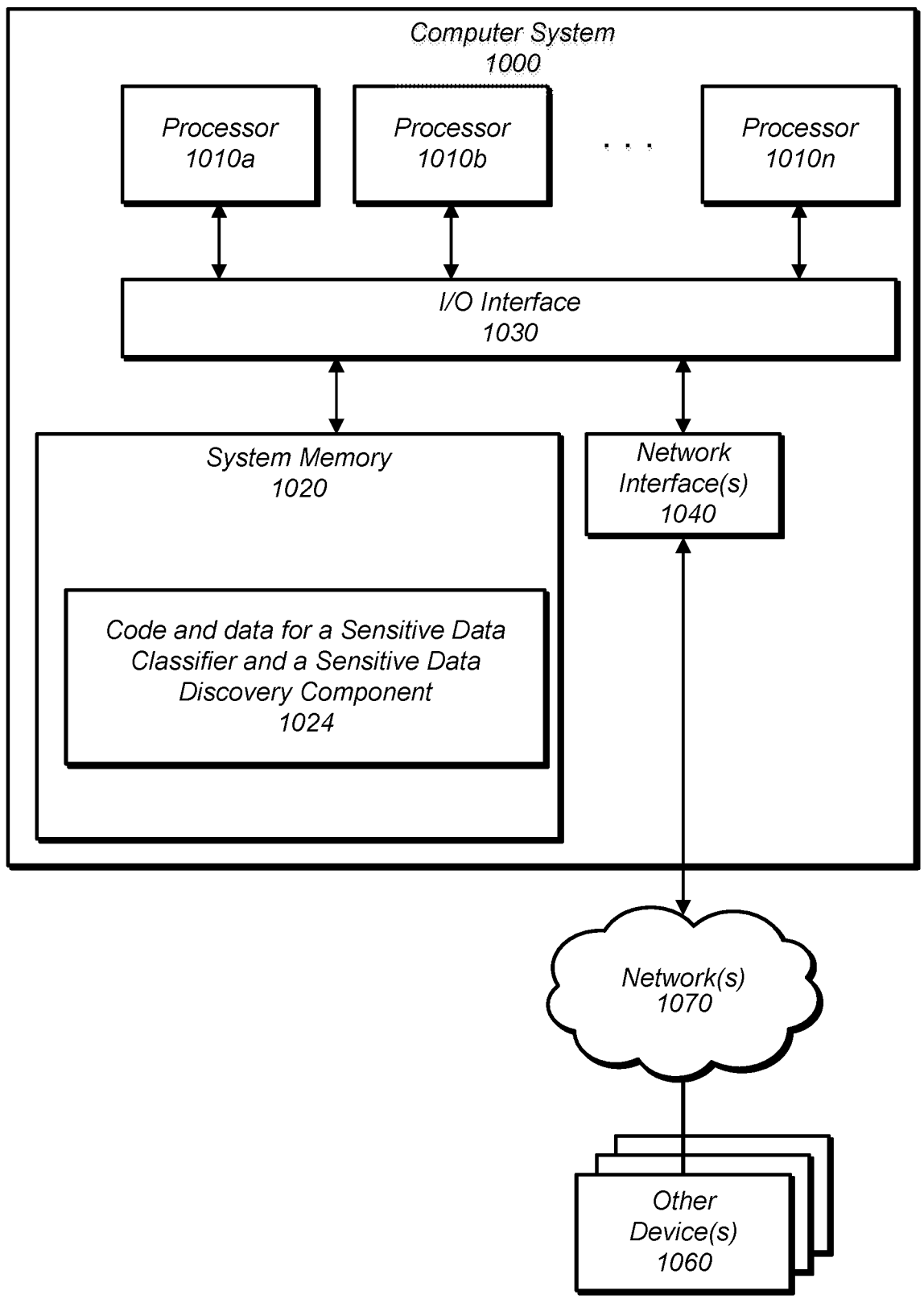
FIG. 10 is a block diagram illustrating an example computer system, according to some embodiments.

FIG. 10 is a block diagram illustrating an example computer system that may be used for a sensitive data classifier and/or a sensitive data discovery component, according to some embodiments.

In at least some embodiments, a computer that implements a portion or all of a hierarchical system and method for identifying sensitive content in data as described herein may include a general-purpose computer system or computing device that includes or is configured to access one or more computer-accessible media, such as computer system 1000 illustrated in FIG. 10. FIG. 10 is a block diagram illustrating an example computer system that may be used in some embodiments. This computer system can be used as a sensitive data classifier 130 and/or a sensitive data discovery component 140, or as a backend resource host which executes one or more of backend resource instances or one or more of the plurality of compute instances (545) in the sensitive data discovery service 540. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for a hierarchical system and method for identifying sensitive content in data, are shown stored within system memory 1020 as the code and data for an automated machine learning pipeline generator 100, the code and data for a sensitive data classifier and/or a sensitive data discovery component.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1070, such as other computer systems or devices as illustrated in FIGS. 1-6, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 9 for implementing a hierarchical system and method for identifying sensitive content in data. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Any of various computer systems may be configured to implement processes associated with the provider network, a hierarchical system and method for identifying sensitive content in data, a sensitive data classifier and/or a sensitive data discovery component, or any other component of the above figures. In various embodiments, the provider network, the hierarchical system and method for identifying sensitive content in data, or any other component of any of FIGS. 1-9 may each include one or more computer systems 1000 such as that illustrated in FIG. 10. In embodiments, the provider network, the hierarchical system and method for identifying sensitive content in data, the sensitive data classifier and/or the sensitive data discovery component, or any other component may include one or more components of the computer system 1000 that function in a same or similar way as described for the computer system 1000.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electro-magnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   a data storage system comprising a plurality of storage devices storing one or more data collections comprising sensitive data text strings and non-sensitive data text strings;
   one or more computing devices, comprising one or more processors and memory, configured to implement one or more sensitive data classifiers local to the data storage system, wherein the one or more sensitive data classifiers are configured to:
      analyze a plurality of data items of the one or more data collections, wherein individual data items comprise a plurality of text strings;
      classify at least some data items of the plurality of data items as containing the sensitive data text strings within a probability threshold, based at least in part on the analysis; and
      provide the at least some data items classified as containing the sensitive data text strings within the probability threshold to a separate sensitive data discovery component; and
   one or more other computing devices, comprising one or more other processors and memory, configured to implement the sensitive data discovery component remote to the data storage system, wherein the sensitive data discovery component is configured to:
      obtain the at least some data items classified by the one or more sensitive data classifiers as containing the sensitive data text strings;
      perform a sensitive data location analysis on the at least some obtained data items to identify a location of the sensitive data text strings distinct from the non-sensitive data text strings within one or more of the data items;
      generate location information for the sensitive data text strings within the one or more data items; and
      provide to a destination information comprising the location information for the sensitive data text strings within the one or more data items.

2. The system as recited in claim 1, wherein the data storage system is a network-based data storage service, wherein the one or more sensitive data classifiers execute on servers within a private network of the network-based data storage service, and wherein the one or more sensitive data classifiers obtain the plurality of data items to analyze without the plurality of data items leaving the private network of the network-based data storage service.

3. The system as recited in claim 2, wherein the sensitive data discovery component and the network-based data storage service are both services provided by a provider network providing services accessible to users over a public network, and wherein the at least some data items classified as containing the sensitive data text strings are transferred between the private network of the network-based data storage service and a private network of the sensitive data discovery component within the provider network, without traversing the public network.

4. The system as recited in claim 1, wherein the data storage system comprises a plurality of storage servers for accessing data on respective groups of the plurality of storage devices, and wherein the one or more sensitive data classifiers execute on respective ones of the plurality of storage servers.

5. A method, comprising:
   analyzing, by a one or more sensitive data classifiers local to a storage system, a plurality of data items, wherein the data items comprise data items stored at the storage system or incoming data items for the storage system;
   classifying, by the one or more sensitive data classifiers, at least some data items of the plurality of data items as containing sensitive data, based at least in part on the analysis;
   recording which of the plurality data items were classified as containing sensitive data; and
   providing the at least some data items to a separate sensitive data discovery component to:
      obtain the at least some data items classified by the one or more sensitive data classifiers as containing the sensitive data;
      perform a sensitive data location analysis on the at least some obtained data items to identify a location of the sensitive data distinct from non-sensitive data within one or more of the data items; and
      generate location information for the sensitive data within the one or more data items.

6. The method as recited in claim 5, wherein the one or more sensitive data classifiers comprise one or more machine learning models trained to analyze the plurality of data items of the storage system.

7. The method as recited in claim 5, wherein the plurality of data items comprise files, documents, text objects, or portions of data within a file, document or object.

8. The method as recited in claim 5, wherein the providing the at least some data items to the separate sensitive data discovery component further comprises:
   encrypting the at least some data items to produce at least some encrypted data items; and
   providing the at least some encrypted data items to the separate sensitive data discovery component over secure connection.

9. The method as recited in claim 5, wherein the one or more sensitive data classifiers and the separate sensitive data discovery component are maintained independently of each other such that they do not share code dependencies.

10. The method as recited in claim 5,
    wherein the analyzing, by the one or more sensitive data classifiers, the plurality of data items, further comprises:
       analyzing, by the one or more sensitive data classifiers, the plurality of data items using at least a binary classifier; and wherein the classifying, by the one or more sensitive data classifiers, the at least some data items of the plurality of data items containing the sensitive data, further comprises:
    marking each analyzed data item of the plurality of data items as either containing or not containing the sensitive data within a probability threshold.

11. The method as recited in claim 5, wherein the sensitive data classifiers analyze the plurality of data items, and classify the at least some data items of the plurality of data items, as part of an ingestion process when the plurality of data items are initially stored to a storage system, and wherein after the providing the at least some data items to the separate sensitive data discovery component, the method further comprises:
    obtaining information from the sensitive data discovery component; and
    storing, in the storage system, at least some of the obtained information from the sensitive data discovery component.

12. The method as recited in claim 5, wherein the analyzing, classifying, recording, and providing are performed responsive to a request to locate sensitive data within a data collection, and wherein only data items of the data collection identified by the one or more sensitive data classifiers as containing sensitive data are provided to the separate sensitive data discovery component, such that other data items of the data collection not identified as containing sensitive data are not transferred to the sensitive data discovery component.

13. A method, comprising:
    receiving a request to provide a sensitive data classifier to a remote destination;
    providing one or more sensitive data classifiers to the remote destination, wherein the one or more sensitive data classifiers:
        analyze a plurality of data items, wherein individual data items comprise sensitive data and non-sensitive data; and
        classify at least some data items of the plurality of data items as containing sensitive data, based at least in part on the analysis;
    obtaining the at least some data items classified by the one or more sensitive data classifiers as containing the sensitive data;
    performing a sensitive data location analysis on the at least some obtained data items to identify a location of the sensitive data, distinct from non-sensitive data within one or more of the data items;
    generating location information for the sensitive data within the one or more data items;
    determining a specified destination for the location information for the sensitive data; and
    providing to the destination the location information for the sensitive data within the one or more data items.

14. The method as recited in claim 13, wherein the plurality of data items comprise a plurality of portions of a plurality of files, wherein the one or more sensitive data classifiers identify at least some portions of at least some files of the plurality of files as containing sensitive data, and wherein the performing the sensitive data location analysis on the at least some obtained data items to identify the location of the sensitive data, further comprises:
    performing, by a sensitive data discovery service, the sensitive data location analysis on the at least some portions of the at least some files in order to identify the location of the sensitive data within one or more of the at least some portions of one or more of the at least some files.

15. The method as recited in claim 13, wherein the plurality of data items comprise a plurality of portions of streaming data, wherein the one or more sensitive data classifiers identify at least some portions of the streaming data as containing sensitive data, and wherein the performing the sensitive data location analysis on the at least some obtained data items to identify the location of the sensitive data, further comprises:
    performing, by a sensitive data discovery service, the sensitive data location analysis on the at least some portions of the streaming data in order to identify the location of the sensitive data within one or more of the at least some portions of the streaming data.

16. The method as recited in claim 13, wherein the plurality of data items comprise a plurality of portions of at least one database, wherein the one or more sensitive data classifiers identify at least some portions of the at least one database as containing sensitive data, and wherein the performing the sensitive data location analysis on the at least some obtained data items to identify the location of the sensitive data, further comprises:
    performing, by a sensitive data discovery service, the sensitive data location analysis on the at least some portions of the at least one database in order to identify the location of the sensitive data within one or more of the at least some portions of the at least one database.

17. The method as recited in claim 13, wherein the obtaining the at least some data items identified by the one or more sensitive data classifiers as containing the sensitive data, further comprises:
    obtaining at least some encrypted data items over a secure connection, wherein the unencrypted data items of the at least some encrypted data items were identified, by the one or more sensitive data classifiers, as containing the sensitive data; and
    decrypting the at least some encrypted data items before performing the sensitive data location analysis.

18. The method as recited in claim 13, wherein the one or more sensitive data classifiers provided to the remote destination comprise one or more machine learning models trained to analyze and classify the plurality of data items of the remote destination.

19. The method as recited in claim 13, wherein the performing the sensitive data location analysis on the at least some obtained data items to identify the location of the sensitive data within the one or more of the data items, further comprises:
    performing the sensitive data location analysis and a sensitive data type analysis on the at least some obtained data items to identify the location of the sensitive data, and a type of sensitive data, within the one or more of the data items;
    wherein the type of sensitive data comprises either a person's name, social security number, driver's license number, credit card information, bank account information, or other personal identifiable information; and
    wherein the information provided to the destination further comprises the type information for the sensitive data within the one or more data items.

20. The method as recited in claim 13, wherein the one or more sensitive data classifiers are provided to a client of a provider network, wherein the one or more sensitive data classifiers run at a client network of the client, and wherein the one or more sensitive data classifiers further send the at least some data items to a sensitive data discovery service of the provider network to perform the obtaining, performing, generating, and providing to a destination steps.

\* \* \* \* \*